United States Patent [19]

Dare et al.

[11] Patent Number: 5,684,950

[45] Date of Patent: Nov. 4, 1997

[54] METHOD AND SYSTEM FOR AUTHENTICATING USERS TO MULTIPLE COMPUTER SERVERS VIA A SINGLE SIGN-ON

[75] Inventors: Timothy S. Dare, Damascus; Eric B. Ek, New Market; Gary L. Luckenbaugh, Gaithersburg, all of Md.

[73] Assignee: Lockheed Martin Corporation, Bethesda, Md.

[21] Appl. No.: 717,961

[22] Filed: Sep. 23, 1996

[51] Int. Cl.$^6$ ................................ G06F 11/00
[52] U.S. Cl. .................... 395/187.01; 395/188.01
[58] Field of Search ................ 395/187.01, 186, 395/188.01, 609, 610, 200.12; 380/3, 4, 23, 25

[56] References Cited

U.S. PATENT DOCUMENTS

| | | | |
|---|---|---|---|
| 4,995,112 | 2/1991 | Aoyama | 380/25 |
| 5,241,594 | 8/1993 | Kung | 380/4 |
| 5,434,918 | 7/1995 | Kung et al. | 380/25 |
| 5,455,953 | 10/1995 | Russell | 395/187.01 |
| 5,481,720 | 1/1996 | Loucks et al. | 395/187.01 |
| 5,491,752 | 2/1996 | Kaufman et al. | 380/25 |
| 5,535,276 | 7/1996 | Ganesan | 380/25 |
| 5,544,322 | 8/1996 | Cheng et al. | 395/200.12 |
| 5,560,008 | 9/1996 | Johnson et al. | 395/200.09 |
| 5,586,260 | 12/1996 | Hu | 395/180 |
| 5,590,199 | 12/1996 | Krajewski, Jr. et al. | 380/25 |
| 5,604,490 | 2/1997 | Blakley, III et al. | 395/187.01 |
| 5,617,570 | 4/1997 | Russell et al. | 395/684 |

OTHER PUBLICATIONS

Trostle et al. "A Flexible Distributed Authorization Protocol", IEEE, Proceedings of SNDSS, pp. 43–52, Feb. 1996.
McMahon "Sesame V2 Public Key and Authorization Extensions to Kerberos", IEEE, Network and Distributed System Security Symposium, pp. 114–131, 1995.
Laferriere et al., "Authentication and Authorization Techniques in Distributed Systems", Carnhan Conf. on Security Technlogy, pp. 164–170, 1993.

Primary Examiner—Robert W. Beausoliel, Jr.
Assistant Examiner—Joseph E. Palys
Attorney, Agent, or Firm—Feldsman, Bradley, Gunter and Dillon

[57] ABSTRACT

A method for authenticating an authorized user to multiple computer servers within a distributed computing environment after a single network sign-on is disclosed. In accordance with the method and system of the present invention, an authentication broker is provided within the distributed computing network. The authentication broker first receives an authentication request from a workstation. After a determination that the authentication request is valid, the authentication broker then issues a Kerberos Ticket Granting Ticket to the workstation. At this point, if there is a request by the workstation for accessing a Kerberos Ticket-based server within the distributed computing network, the authentication broker will issue a Kerberos Service Ticket to the workstation. Similarly, if there is a request by the workstation for accessing a passticket-based server within the distributed computing network, the authentication broker will issue a passticket to the workstation. Finally, if there is a request by the workstation for accessing a password-based server within the distributed computing network, the authentication broker will issue a password to the workstation. By this, accesses to all of the above servers within the distributed computing network can be granted via a single network authentication request.

15 Claims, 6 Drawing Sheets

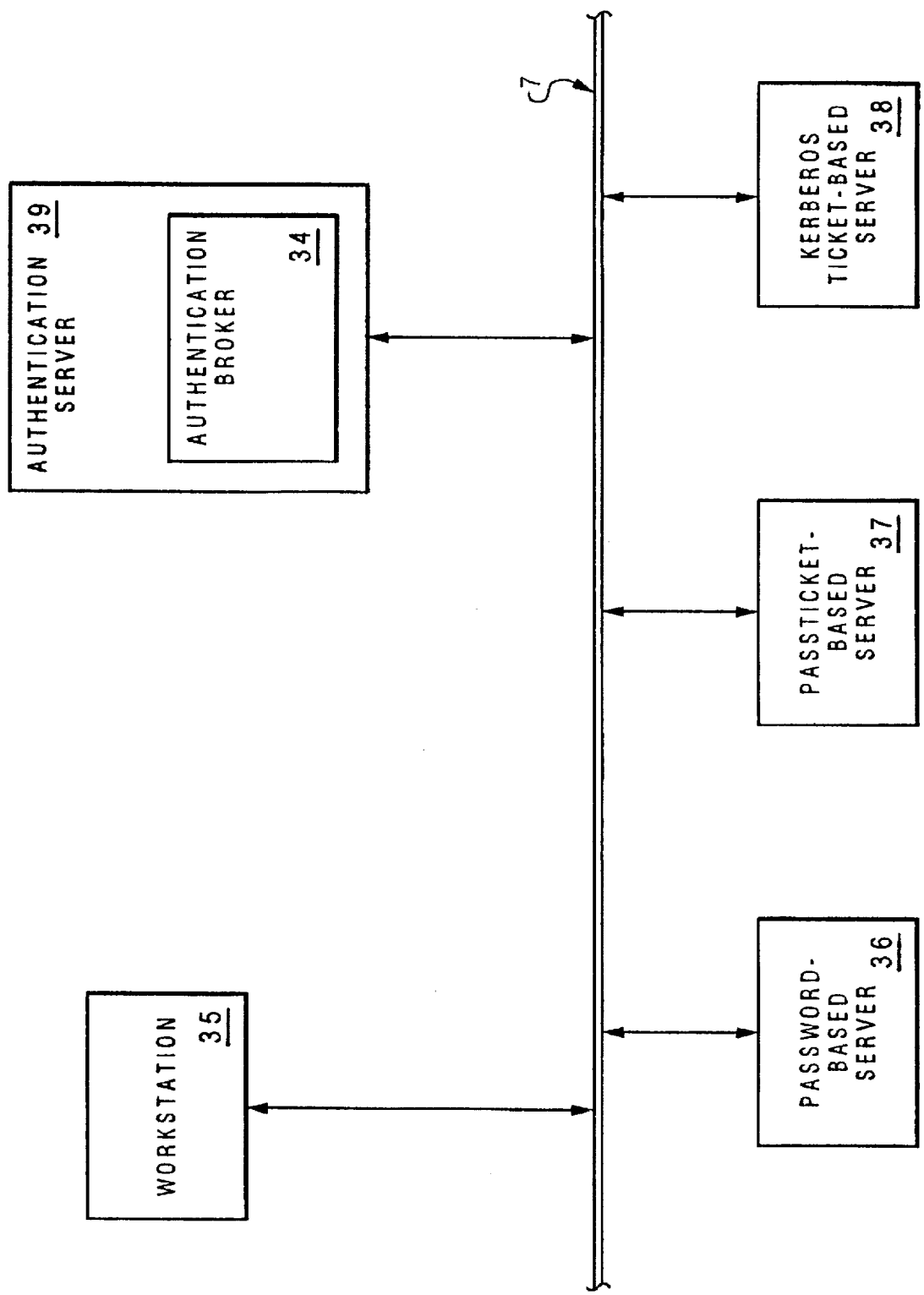

METHOD AND SYSTEM FOR AUTHENTICATING USERS TO MULTIPLE COMPUTER SERVERS VIA A SINGLE SIGN-ON

The present invention was developed with the support of the U.S. Government under Contract No. 94-P190800-000. the U.S. Government has certain rights in this invention.

BACKGROUND OF THE INVENTION

1. Technical Field

The present invention relates to a method and system for data processing in general and, in particular, to a method and system for processing sign-on requests within a distributed computer network. Still more particularly, the present invention relates to a method and system for authenticating an authorized user with respect to multiple computer servers within a distributed computing environment after a single network sign-on.

2. Description of the Prior Art

In a multiuser computer system, identification and authentication mechanisms are essential for identifying and authenticating each individual who requests any usage of system resources. The most common implementation of such mechanisms is a user identification (ID) along with a password. Thus, each multiuser computer system contains, as a minimum, a unique sign-on ID for each registered user to the system. This allows for accountability of system usage down to an individual.

However, when such user identification and authentication implementation methodology is extrapolated to more than one computer system within a distributed computing environment, a user must repeatedly provide a user ID along with an appropriate password in order to gain access to each computer system. For a user who wishes to gain access to several services, each provided by a different computer system, within a single session, this repetitious sign-on procedure tends to be very tedious if not annoying. Especially, in most cases, the user ID and password to each computer system within the distributed computing environment are so distinctive that it is very inconvenient for the user to remember several unique user IDs and passwords. Further, in order to sign-on remotely, the user ID and password must be transmitted to a remote computer system. Without a secure path between the user's computer system and the remote computer system, anyone who has access to the distributed computing environment could use a network analyzer to discover the user ID and password of the user. As such, the effectiveness of the sign-on procedure as a means of security measure may be undermined.

One solution for single sign-on and authentication in a distributed computing environment is known as "Kerberos." Kerberos is an authentication protocol developed as part of Project Athena at Massachusetts Institute of Technology. Kerberos provides an excellent platform for single sign-on and authentication in an open network environment. Unfortunately, Kerberos support is not transparent and requires various custom modifications to the applications as well as the system utilities by a way often referred to as "Kerberizing." As the popularity of Kerberos grows in recent years, many operating systems and application vendors are beginning to provide support for Kerberos, but this support is far from universal. For this reason, it is not possible to solely rely upon Kerberos as the only means for single sign-on in a distributed computing environment.

Other solutions include a sign-on product known as "TPX" by Legion Technologies Corporation. TPX is a mainframe product for a MVS/VM processing environment. TPX provides automated sign-on to all MVS sessions within a distributed computing environment after an initial authentication to the host computer system. However, TPX also only produces an homogeneous solution, aside from the fact that it is still relatively expensive to implement.

Consequently, it would be desirable to provide a method and system for authenticating an authorized user to all computer servers within a distributed computing environment that are available to the authorized user after a single network sign-on while without sacrificing network security.

SUMMARY OF THE INVENTION

In view of the foregoing, it is therefore an object of the present invention to provide an improved method and system for data processing.

It is another object of the present invention to provide an improved method and system for processing sign-on requests within a distributed computer network.

It is yet another object of the present invention to provide an improved method and system for authenticating an authorized user to multiple computer servers within a distributed computing environment after a single network sign-on.

In accordance with the method and system of the present invention, an authentication broker is provided within the distributed computing network. The authentication broker first receives an authentication request from a workstation. After a determination that the authentication request is valid, the authentication broker then issues a Kerberos Ticket Granting Ticket to the workstation. At this point, if there is a request from the workstation for accessing a Kerberos Ticket-based server within the distributed computing network, the authentication broker will issue a Kerberos Service Ticket to the workstation. Similarly, if there is a request from the workstation for accessing a passticket-based server within the distributed computing network, the authentication broker will issue a passticket to the workstation. Finally, if there is a request from the workstation for accessing a password-based server within the distributed computing network, the authentication broker will issue a password to the workstation. By this, accesses to all of the above servers within the distributed computing network can be granted via a single network authentication request.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2 is an illustration of various types of authentication schemes by which a computer server can be utilized within the distributed computing network of FIG. 1;

FIG. 3b is a high-level flow diagram of the authentication protocol for passticket-based servers, according to a preferred embodiment of the invention;

DETAILED DESCRIPTION OF PREFERRED EMBODIMENT

The present invention may be applicable to a variety of distributed computing networks, such as a local-area network (LAN) or a wide-area network (WAN), under a number of different operating systems. The computers within the distributed computing networks may be personal computers, mini-computers, or mainframe computers.

Figure 1:
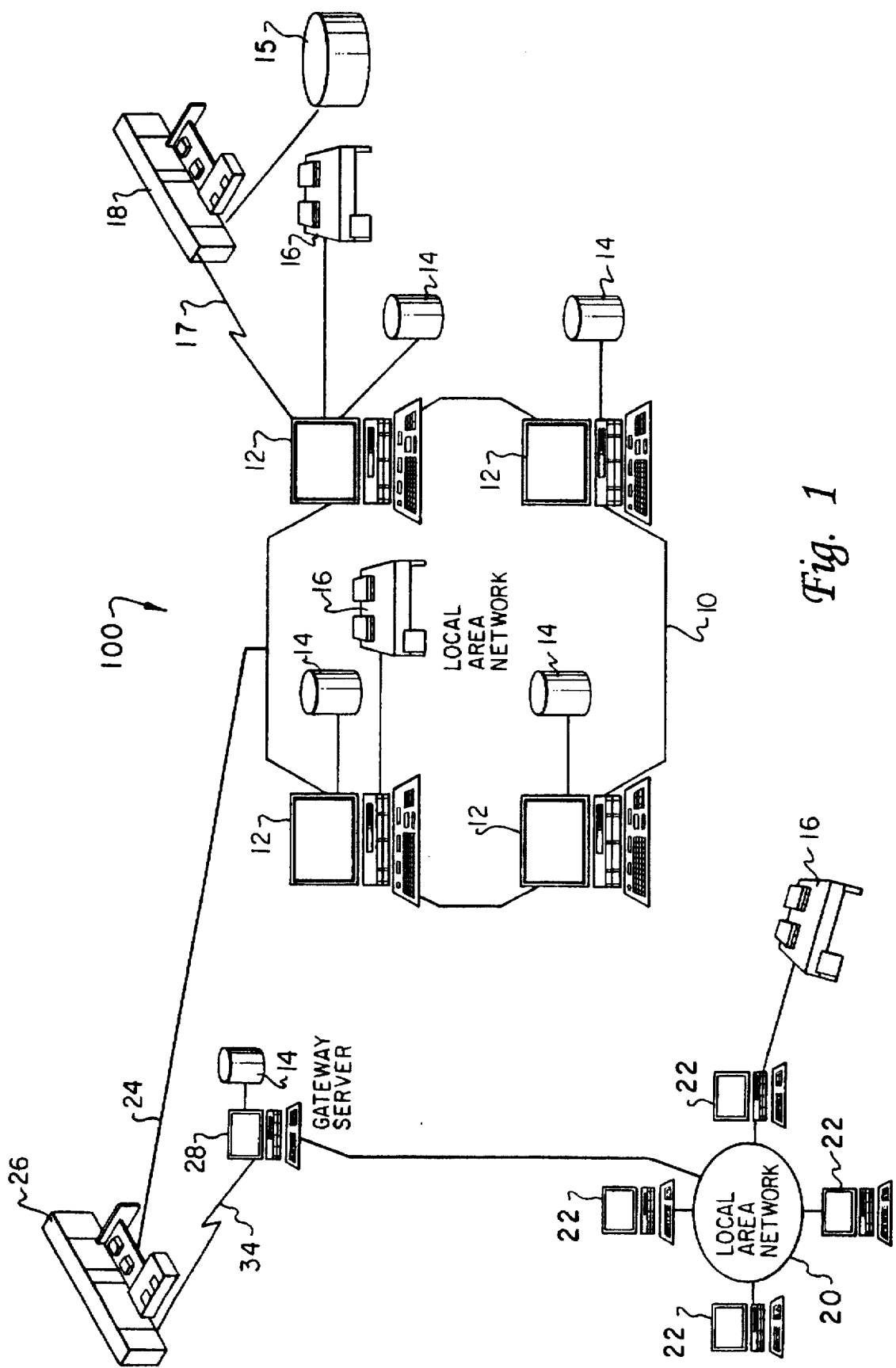
FIG. 1 is a pictorial representation of a distributed computing network in which a preferred embodiment of the present invention may be utilized.

Referring now to the drawings and in particular to FIG. 1, there is depicted a pictorial representation of a distributed computing network 100 in which a preferred embodiment of the present invention may be utilized. As shown in FIG. 1, distributed computing network 100 may include a plurality of local networks, such as LANs 10 and 20, each of which preferably includes a plurality of computers 12 and 22, respectively. Of course, those skilled in the art will appreciate that a plurality of Intelligent Workstations coupled to a host processor may also be utilized for each of LANs 10 and 20. Each of computers 12, 22 may be coupled to a storage device 14 and/or an output device 16. One or more of storage devices 14 may be utilized to store various types of information within distributed computing network 100.

Still referring to FIG. 1, distributed computing network 100 may also include several mainframe computers, such as mainframe computer 18 and mainframe computer 26. As shown, mainframe computer 18 is coupled to LAN 10 by means of communications link 17. Mainframe computer 18 is also coupled to a storage device 15 which may serve as a remote storage for LAN 10. LAN 20 is coupled to LAN 10 via gateway server 28, communications links 24, 34, and mainframe computer 26 which serves as a communications controller. Gateway server 28 may be a computer or an Intelligent Workstation. Mainframe computer 18 may be situated in a location that is very far from LAN 10. Similarly, LAN 10 may be situated in a location that is also very far from LAN 20. For example, LAN 20 may be located in California, while LAN 10 may be located in Texas, and mainframe computer 18 may be located in New York.

With reference now to FIG. 2, there is illustrated various types of authentication schemes which a computer server can utilize within distributed computing network 100 of FIG. 1. As shown, a password-based server 36, a passticket-based server 37, and a Kerberos ticket-based server 38 are connected to a network communication link 7. In addition, a workstation 35 and an authentication server 39 are also connected to network communication link 7.

For the purpose of illustrating the present invention, the disclosed method is intended to allow a user to gain access to a password-based server 36, a passticket-based server 37, and a Kerberos ticket-based server 38 within the distributed computing network by simply utilizing a single sign-on at workstation 35. However, it is understood by those skilled in the art that the disclosed method is also applicable to a multiple of any or all of the above-mentioned servers. First, the user enters a user ID along with an appropriate password at workstation 35. Communication between workstation 35 and authentication server 39 is then established. The authentication of the user ID and password is subsequently attempted by an authentication broker 34, and if correct, the authentication is achieved. This permits an open session to occur such that the user may utilize all services provided by Kerberos Ticket-based server 38. At a later time, if the user desires to utilize the services offered by passticket-based server 37 and/or password-based server 36, the subsequent sign-on information is automatically provided by authentication broker 34 for authentication server 39. Accordingly, access to passticket-based server 37 and password-based server 36 is obtained without the additional input of a user ID and password for these servers.

Figure 3A:
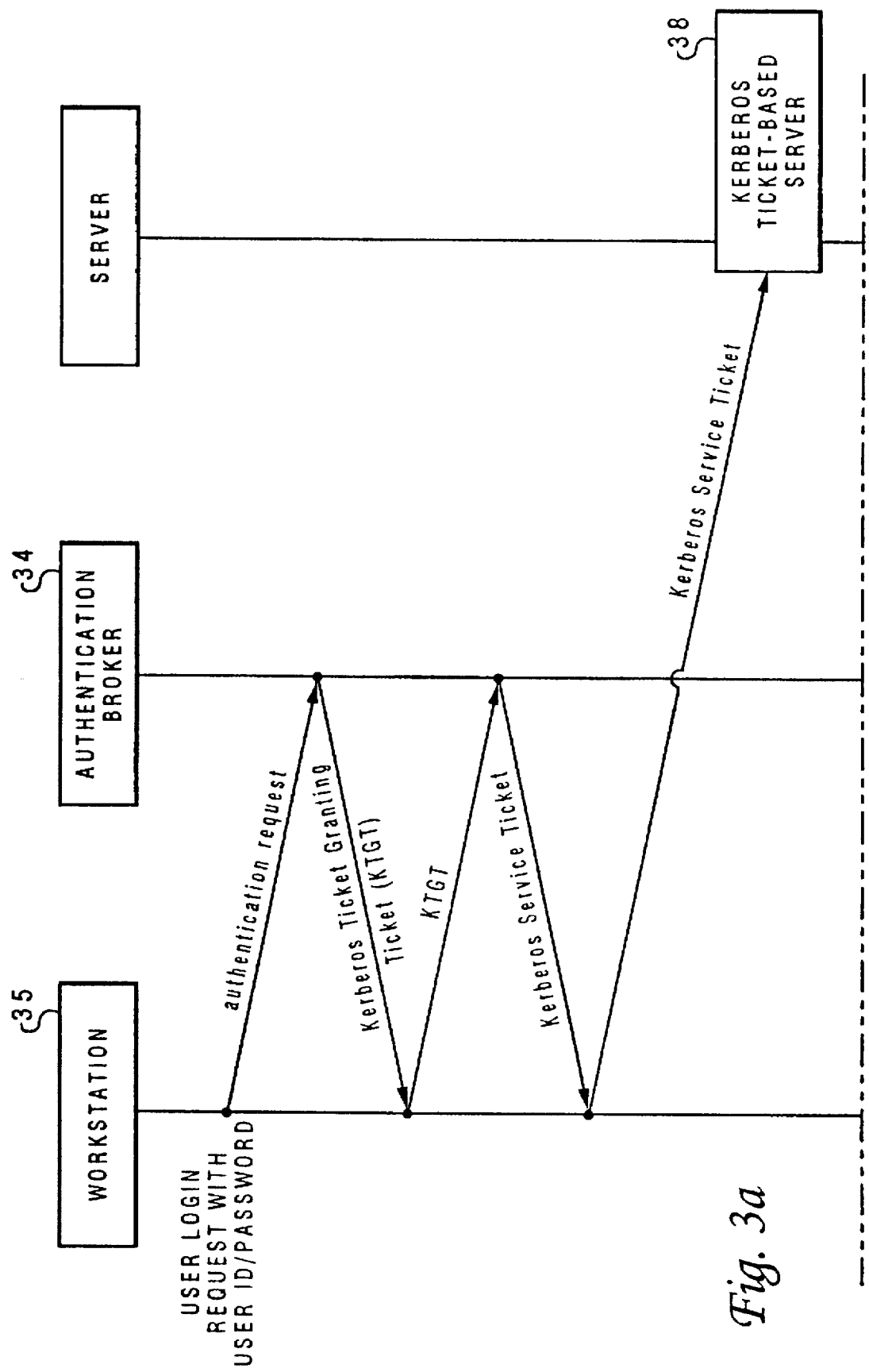
FIG. 3a is a high-level flow diagram of the authentication protocol for Kerberos Ticket-based servers, according to a preferred embodiment of the invention.
Figure 36:
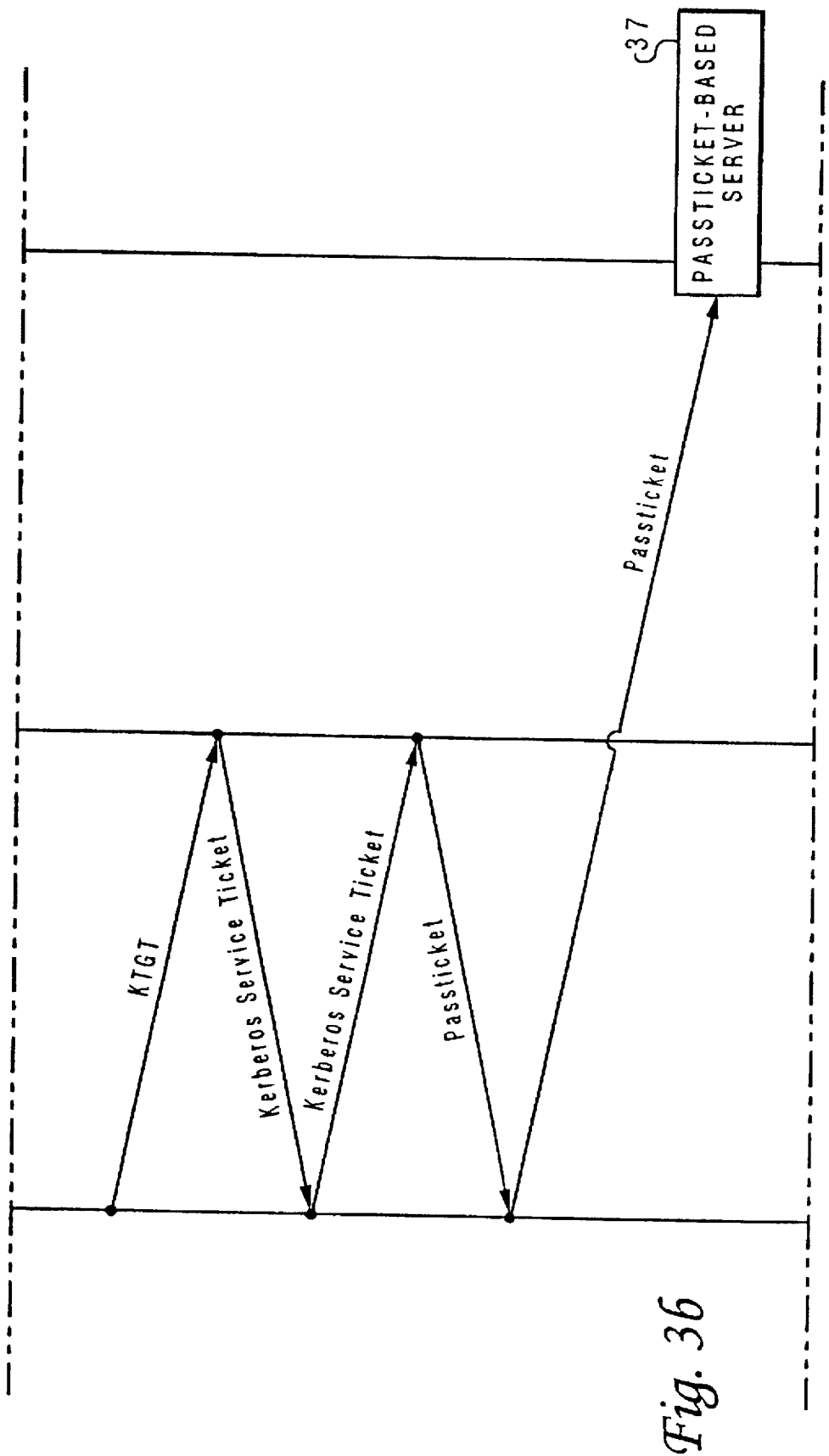

Referring now to FIG. 3a, there is depicted a high-level flow diagram of the authentication protocol for Kerberos Ticket-based servers, according to a preferred embodiment of the invention. Initially, a user signs on with a user ID and an associated password at workstation 35. An authentication request is sent to authentication broker 34 with the user ID and the password. If the user is an authorized user, authentication broker 34 then sends a Kerberos Ticket Granting Ticket (KTGT) back to requesting workstation 35. At this point, if workstation 15 would desire services from a Kerberos Ticket-based server 38, workstation 35 has to send the KTGT to authentication broker 34 to exchange for a Kerberos Service Ticket (KST) in order to gain access to Kerberos Ticket-based server 38. If there are more Kerberos Ticket-based servers in the distributed computing network that the user at workstation 35 would like to access during a same session, the same KTGT will be sent to authentication broker 34 in order to exchange for another KST to gain access to these Kerberos Ticket-based servers. Each Kerberos Ticket-based server requires a new and separate KST for access.

Referring now to FIG. 3b, there is depicted a high-level flow diagram of the authentication protocol for passticket-based servers, according to a preferred embodiment of the invention. If workstation 35 would desire a service from a passticket-based server 37, workstation 35 has to send the KTGT to authentication broker 34 to exchange for another KST. In turn, this KST is sent back to authentication broker 34 to exchange for a passticket in order to gain access to passticket-based server 37. Similarly, if there are more passticket-based servers in the distributed computing network that workstation 35 would like to access during the same session, the same KTGT will be sent to authentication broker 34 in order to exchange for another KST and passticket to gain access to these passticket-based servers. Each passticket-based server requires a separate passticket for access.

Figure 3C:
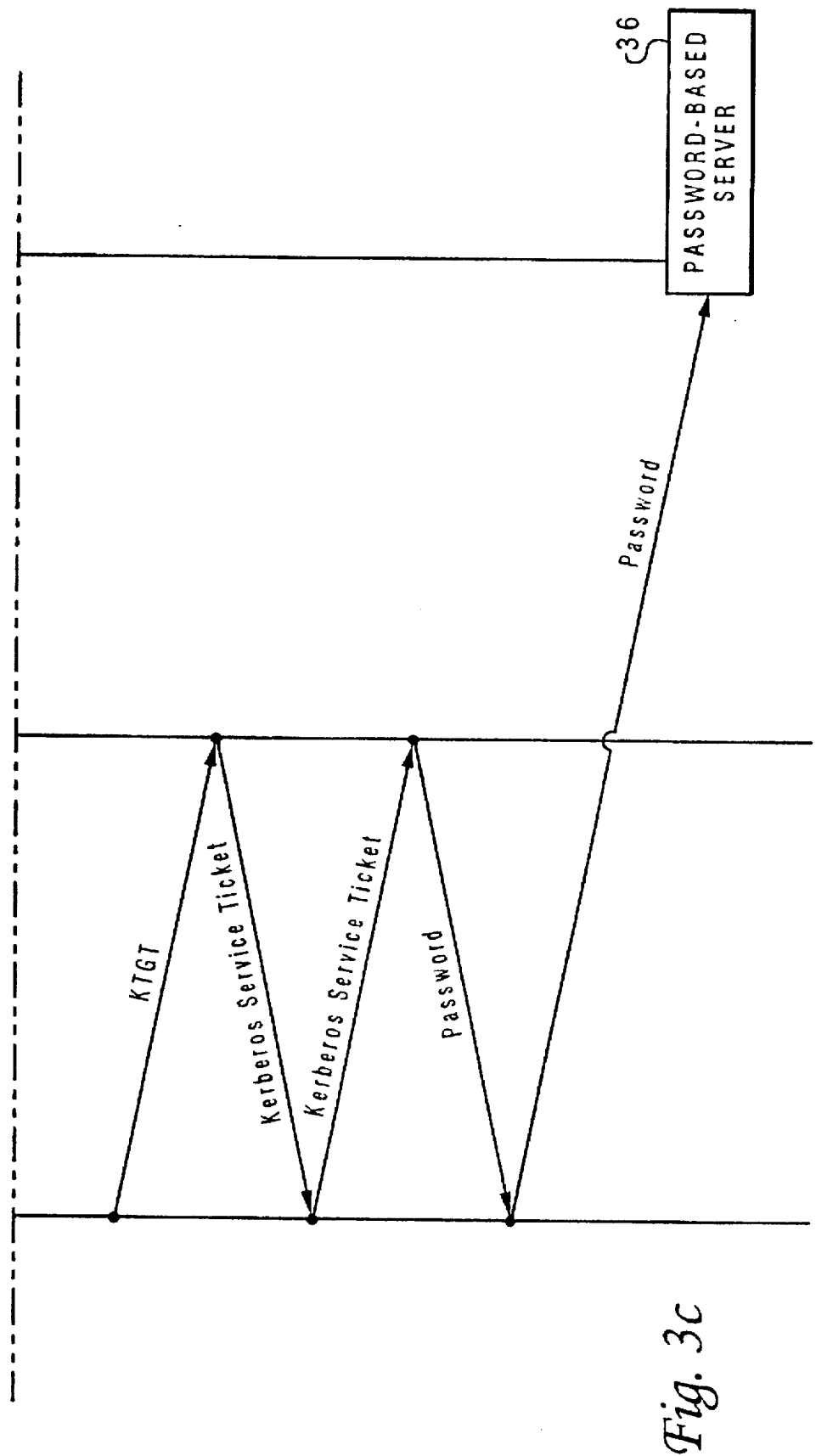
FIG. 3c is a high-level flow diagram of the authentication protocol for password-based servers, according to a preferred embodiment of the invention.

Referring now to FIG. 3c, there is depicted a high-level flow diagram of the authentication protocol for password-based servers, according to a preferred embodiment of the invention. If workstation 35 would desire a service from a password-based server 36, workstation 35 has to send the KTGT to authentication broker 34 to exchange for another KST. In turn, this KST is sent back to authentication broker 34 to exchange a password in order to gain access to password-based server 36. Similarly, if there are more password-based servers in the distributed computing network that workstation 35 would like to access during the same session, the same KTGT will be sent to authentication broker 34 in order to exchange for another KST and password to gain access to these password-based servers. Each password-based server requires a separate password for access.

Figure 4:
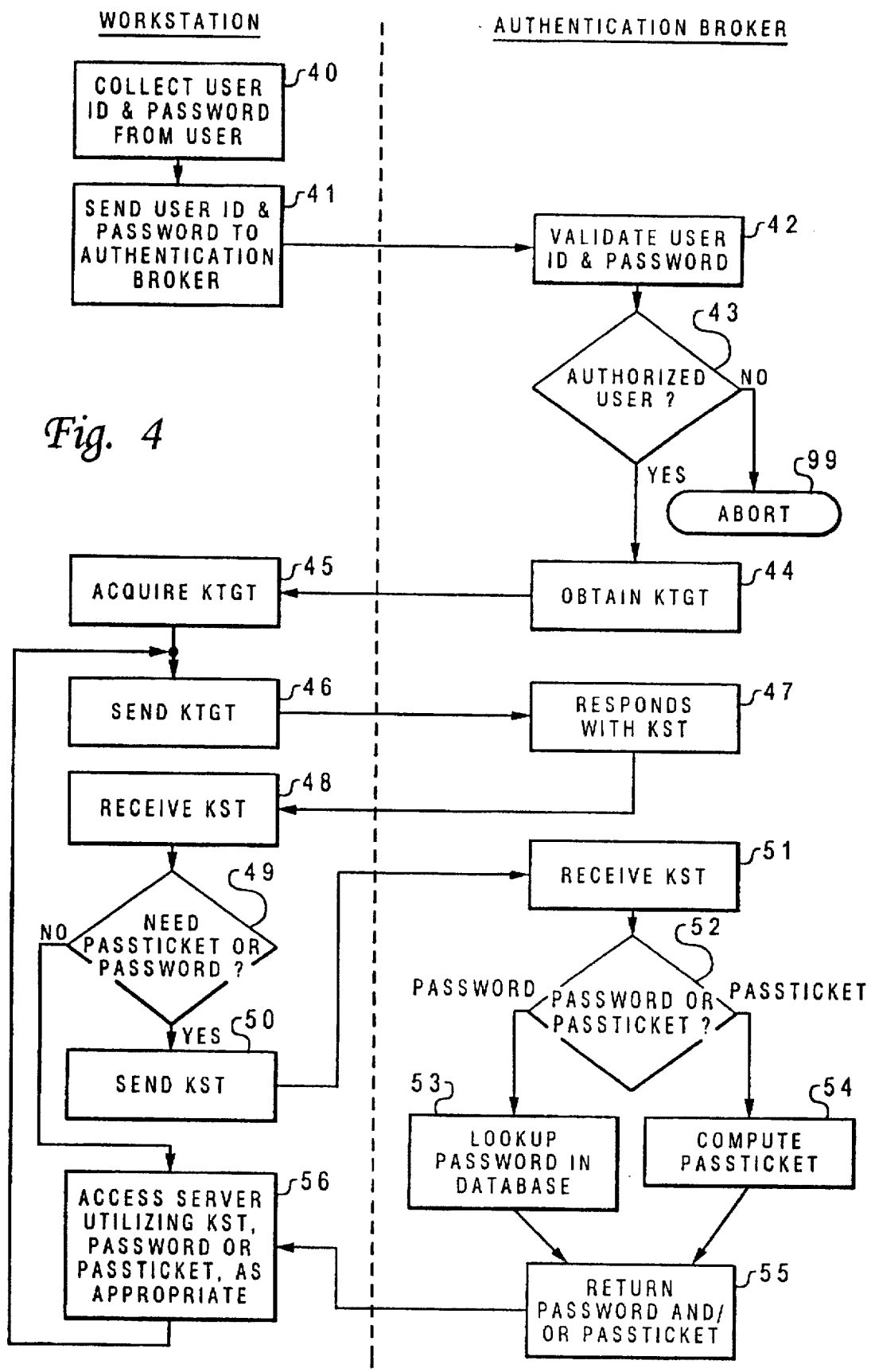
FIG. 4 is a high-level logic flow diagram of a method for authenticating sign-on requests to multiple computer servers, in accordance with a preferred embodiment of the invention.

Referring now to FIG. 4, there is illustrated a high-level logic flow diagram of a method for authenticating sign-on requests to multiple computer servers, in accordance with a preferred embodiment of the invention. Starting at block 40, a user ID and a password are collected from a user at the workstation. The user ID along with the password are then sent to the authentication broker, as shown in block 41. The user ID and the password information are accepted by the authentication broker for authenticating the validity of the user, as illustrated in block 42. A determination is then made as to whether or not the user is an authorized user, as depicted in block 43. If the user is not an authorized user, the process is aborted, as shown in block 99. Otherwise, if the user is an authorized user, a Kerberos Ticket Granting Ticket (KTGT) is obtained from the authentication server by the authentication broker, as shown in block 44. The Kerberos Ticket Granting Ticket is then returned from the authentication broker to the requesting workstation, as depicted in block 45. In turn, this Kerberos Ticket Granting Ticket is subsequently sent back to the authentication broker each time a new server is requested by the user at the workstation during the same session, as illustrated in block 46. After receiving the Kerberos Ticket Granting Ticket, this time the authentication broker responds by sending a Kerberos Service Ticket (KST) back to the requesting workstation, as shown in blocks 47 and 48. This KST is valid for gaining access to a Kerberos Ticket-based server.

A determination is made at the workstation as to whether or not a password and/or passticket are also needed, as shown in block 49. If neither a password nor a passticket is required, the process goes to block 56. Otherwise, if either a password or a passticket is required (or both a password and a passticket are required), the Kerberos Service Ticket is sent to the authentication broker once again, as illustrated in block 50. After receiving the Kerberos Service Ticket, a determination is subsequently made within the authentication broker as to whether a password or a passticket is needed, as shown in blocks 51 and 52. If a passticket is needed, the passticket is computed within the authentication broker, as shown in block 54. On the contrary, if a password is needed, a table lookup is performed by the authentication broker in a database containing all the passwords, as shown in block 53. The computed passticket and/or obtained password are then returned back to the requesting workstation, as shown in block 55. At this point, the requesting workstation can access a server within the distributed computing network utilizing a Kerberos Service Ticket, a passticket or a password, as appropriate.

As has been described, the present invention provides an improved method and system for authenticating an authorized user to multiple computer servers within a distributed computing network that are available to the authorized user after a single network sign-on. The method and system of the present invention are intended for accessing computer servers that utilize passwords, passtickets, or Kerberos Tickets. The present invention provides the capability to exploit the Kerberos authentication scheme within a distributed computing environment where not all applications and computer servers understand the Kerberos protocols.

While the invention has been particularly shown and described with reference to a preferred embodiment, it will be understood by those skilled in the art that various changes in form and detail may be made therein without departing from the spirit and scope of the invention.

What is claimed is:

1. A method for authenticating a user with respect to multiple computer servers within a distributed computing network, said method comprising:

providing an authentication broker within said distributed computing network;

receiving an authentication request from a workstation at said authentication broker;

issuing a Kerberos Ticket Granting Ticket to said workstation from said authentication broker after a determination that said authentication request is valid;

issuing a Kerberos Service Ticket to said workstation from said authentication broker in response to an access request from said workstation to a Kerberos Ticket-based server within said distributed computing network;

issuing a passticket to said workstation from said authentication broker in response to an access request from said workstation to a passticket-based server within said distributed computing network;

issuing a password to said workstation from said authentication broker in response to an access request from said workstation to a password-based server within said distributed computing network, such that accesses to all said servers are granted via a single network authentication request.

2. The method for authenticating a user to multiple computer servers within a distributed computing network according to claim 1, wherein said step of receiving an authentication request further includes a step of receiving a user identification and an associated password.

3. The method for authenticating a user to multiple computer servers within a distributed computing network according to claim 1, wherein said step of issuing a Kerberos Service Ticket further includes a step of exchanging said Kerberos Ticket Granting Ticket for said Kerberos Service Ticket.

4. The method for authenticating a user to multiple computer servers within a distributed computing network according to claim 1, wherein said step of issuing a passticket further includes a step of exchanging said Kerberos Ticket Granting Ticket for a second Kerberos Service Ticket and a step of exchanging said second Kerberos Service Ticket for said passticket.

5. The method for authenticating a user to multiple computer servers within a distributed computing network according to claim 1, wherein said step of issuing a password further includes a step of exchanging said Kerberos Ticket Granting Ticket for a third Kerberos Service Ticket and a step of exchanging said third Kerberos Service Ticket for said password.

6. A computer program product stored on a computer readable medium for authenticating a user with respect to multiple computer servers within a distributed computing network, said computer product comprising:

program code means for receiving an authentication request from a workstation at said authentication broker;

program code means for issuing a Kerberos Ticket Granting Ticket to said workstation from said authentication broker after a determination that said authentication request is valid;

program code means for issuing a Kerberos Service Ticket to said workstation from said authentication broker in response to an access request from said workstation to a Kerberos Ticket-based server within said distributed computing network;

program code means for issuing a passticket to said workstation from said authentication broker in response to an access request from said workstation to a passticket-based server within said distributed computing network;

program code means for issuing a password to said workstation from said authentication broker in response to an access request from said workstation to a password-based server within said distributed computing network, such that accesses to all said servers are granted via a single network authentication request.

7. The computer program product for authenticating a user to multiple computer servers within a distributed computing network according to claim 6, wherein said program code means for receiving an authentication request further includes a program code means for receiving a user identification and an associated password.

8. The computer program product for authenticating a user to multiple computer servers within a distributed computing network according to claim 6, wherein said program code means for issuing a Kerberos Service Ticket further includes a program code means for exchanging said Kerberos Ticket Granting Ticket for said Kerberos Service Ticket.

9. The computer program product for authenticating a user to multiple computer servers within a distributed computing network according to claim 6, wherein said program code means for issuing a passticket further includes a program code means for exchanging said Kerberos Ticket Granting Ticket for a second Kerberos Service Ticket and a program code means for exchanging said second Kerberos Service Ticket for said passticket.

10. The computer program product for authenticating a user to multiple computer servers within a distributed computing network according to claim 6, wherein said program code means for issuing a password further includes a program code means for exchanging said Kerberos Ticket Granting Ticket for a third Kerberos Service Ticket and a program code means for exchanging said third Kerberos Service Ticket for said password.

11. An authentication broker for authenticating a user to multiple computer servers within a distributed computing network, said authentication broker comprising:

means for receiving an authentication request from a workstation;

means for issuing a Kerberos Ticket Granting Ticket to said workstation after a determination that said authentication request is valid;

means for issuing a Kerberos Service Ticket to said workstation in response to an access request from said workstation to a Kerberos Ticket-based server within said distributed computing network;

means for issuing a passticket to said workstation in response to an access request from said workstation to a passticket-based server within said distributed computing network;

means for issuing a password to said workstation in response to an access request from said workstation to a password-based server within said distributed computing network, such that accesses to all said servers are granted via a single network authentication request.

12. The authentication broker for authenticating a user to multiple computer servers within a distributed computing network according to claim 11, wherein said means for receiving an authentication request further includes a means for receiving a user identification and an associated password.

13. The authentication broker for authenticating a user to multiple computer servers within a distributed computing network according to claim 11, wherein said means for issuing a Kerberos Service Ticket further includes a means for exchanging said Kerberos Ticket Granting Ticket for said Kerberos Service Ticket.

14. The authentication broker for authenticating a user to multiple computer servers within a distributed computing network according to claim 11, wherein said means for issuing a passticket further includes a means for exchanging said Kerberos Ticket Granting Ticket for a second Kerberos Service Ticket and a means for exchanging said second Kerberos Service Ticket for said passticket.

15. The authentication broker for authenticating a user to multiple computer servers within a distributed computing network according to claim 11, wherein said means for issuing a password further includes a means for exchanging said Kerberos Ticket Granting Ticket for a third Kerberos Service Ticket and a means for exchanging said third Kerberos Service Ticket for said password.

* * * * *